US007319571B2

United States Patent
Xu et al.

(10) Patent No.: US 7,319,571 B2
(45) Date of Patent: Jan. 15, 2008

(54) OVERMOLD MATERIAL AND METAL BASE INTERFACE DESIGN FOR LEAKAGE REDUCTION IN A DISC DRIVE

(75) Inventors: Mo Xu, Singapore (SG); Johnan S J Koong, Singapore (SG); Yiren Hong, Singapore (SG); Pohlye Lim, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 453 days.

(21) Appl. No.: 11/064,175

(22) Filed: Feb. 23, 2005

(65) Prior Publication Data
US 2006/0187576 A1  Aug. 24, 2006

(51) Int. Cl.
*G11B 17/00*  (2006.01)
(52) U.S. Cl. .................................. 360/97.01
(58) Field of Classification Search ............. 29/603.03
See application file for complete search history.

(56) References Cited

U.S. PATENT DOCUMENTS

| 4,491,888 A | 1/1985 | Brown |
|---|---|---|
| 4,553,183 A | 11/1985 | Brown |
| 5,541,787 A * | 7/1996 | Jabbari et al. ............ 360/97.01 |
| 5,602,697 A * | 2/1997 | Jeong et al. ............. 360/97.02 |
| 5,706,573 A * | 1/1998 | Lee .......................... 29/603.03 |
| 6,034,481 A | 3/2000 | Haynes |
| 6,178,061 B1 | 1/2001 | Obara |
| 6,404,596 B1 | 6/2002 | McReynolds |
| 6,426,847 B1 * | 7/2002 | Dague et al. ............ 360/97.01 |

OTHER PUBLICATIONS

Seagate application STL11244 author "Chee, Waionn Wai Onn" filed Jun. 18, 2003, application/drawings ( 22 pages).

* cited by examiner

*Primary Examiner*—William Korzuch
*Assistant Examiner*—Mark Blouin
(74) *Attorney, Agent, or Firm*—Leanne Taveggia Farrell; Westman, Champlin & Kelly, P.A.

(57) ABSTRACT

A base plate of a disc storage system including an interior and an exterior surface, an entrance hole passes between the two surfaces and a groove surrounds the entrance hole and reduces the passage of air along an interface between the exterior and the interior surfaces. The groove may be in the shape of a circle or other alternative shapes such as a rectangle, as considered within the plane of the interior surface. An overmold is molded to the base plate and fills the groove. The plate is generally made of a plastic. The groove is amenable to the stamping process as well.

20 Claims, 7 Drawing Sheets

FIG. 1C
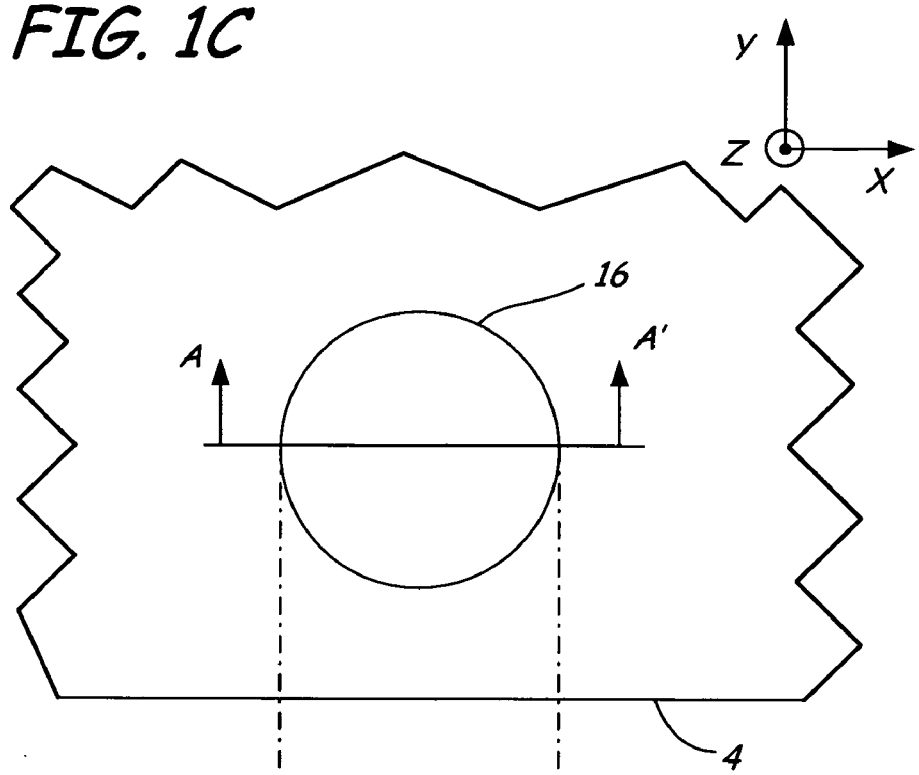
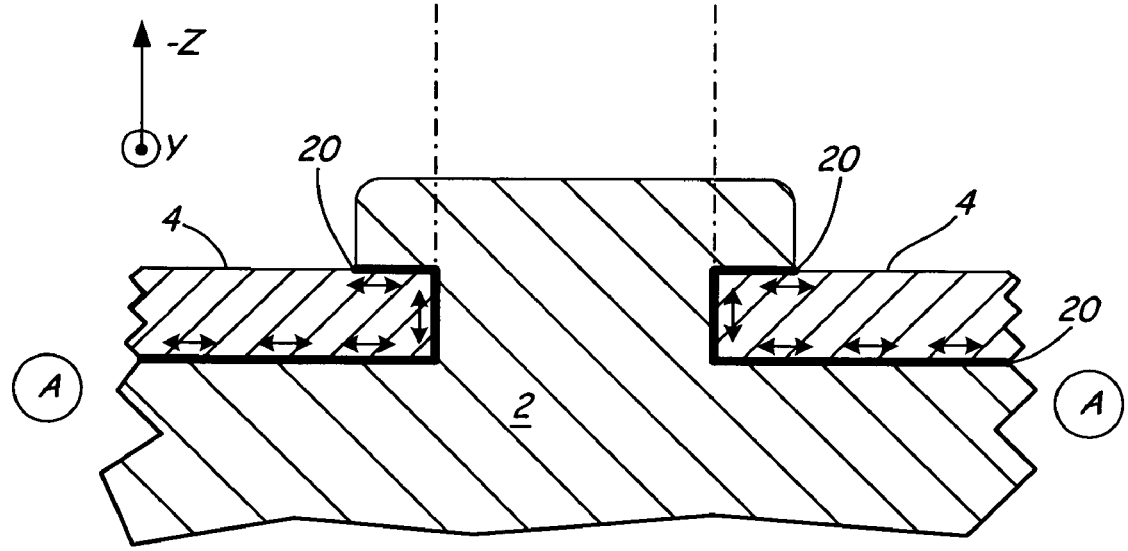
FIG. 1D

OVERMOLD MATERIAL AND METAL BASE INTERFACE DESIGN FOR LEAKAGE REDUCTION IN A DISC DRIVE

FIELD OF THE INVENTION

The present invention relates generally to disc drive storage devices, and more particularly, but not by limitation, to a base for disc drive storage.

BACKGROUND OF THE INVENTION

Disc drives are commonly used in work stations, personal computers, portable computers, and other computer systems to store large amounts of data in a form that can be made readily available to a user. In general, a disc drive comprises one or more magnetic discs that are rotated by a spindle motor at a constant high speed. A transducer is used to write and/or read back information from the surface of a disc.

Continued demand exists for higher disc drive performance from disc drives having smaller form factors. Such demands require increases in spindle motor rotation speeds, increases in areal density recording capabilities, and faster data access times, along with decreases in the size of the disc drive components and the housing that encloses them. Standard disc drives used in personal computers are formed in accordance with a one-inch form factor (height). Such standard disc drives have been essentially miniaturized to form microdrives. Such microdrives typically have a 5.0 millimeter (mm) form factor and are formed in accordance with CompactFlash® Type II specifications. One of the difficulties in meeting such a small form factor is the formation of the base of the micro drive that provides support for the components of the disc drive and which also prevents contamination from reaching the inside of the disc drive.

Disc drive bases are designed to provide the necessary structural integrity to support the mounting of internal disc drive components as well as to support attachment of the disc drive to a user environment. Typically, disc drive bases are formed from an aluminum casting or stamping process and undergo secondary machining operations as required to form the requisite critical surfaces for proper alignment of the disc drive components. Certain of the larger features on the base, such as motor and base interfaces, lend themselves to manufacturing by this stamping and secondary machining. However, other more detailed features such as the mounting slot, the filter holder and actuator crash stops are difficult to make by this process alone, especially given more stringent form factor requirements of small designs. In these designs, an overmolded plastic injection process is used to create a composite metal/plastic base. In this process, plastic is injected through entrance holes in the base and the plastic allowed to set while a mold remains in place over the base. The overmolded plastic portion of the base closely follows the surface of the metal base where intended. In some cases, however, the interface between the plastic and the metal base also permits air to flow into the disc drive. This can allow particle contamination to enter the drive housing.

To address the continued demands for ever decreasing form factors, such as the 3.3 mm form factor of CompactFlash® Type I specifications, new base designs can be employed. However, the base design should be configured to reduce entry of contaminated particles into the housing. Embodiments of the present invention provide solutions to meet such disc drive base demands while offering other advantages over bases of the prior art.

Other features and benefits that characterize embodiments of the present invention will be apparent upon reading the following detailed description and review of the associated drawings.

SUMMARY OF THE INVENTION

The present invention generally relates to a base for use in a disc drive. The base has an interior and an exterior surface relative to the disc drive, and there is an entrance hole or opening passing between the two surfaces. A groove surrounding the entrance hole and minimizes the passage of air from the exterior surface to the interior surface. The groove may be in the shape as desired. The base is generally made of stamped or machined metal, and the overmold material generally made of a moldable material. The groove is amenable to the stamping process as well.

In another embodiment, an additional groove surrounds the first groove, which further minimizes the passage of air between the exterior and the interior of the disc drive. Further embodiments include a plurality of grooves extending around the first groove for further minimizing air flow into the interior of the disc drive. Further refinements can be made to the present invention, including the use of a groove with different shapes.

BRIEF DESCRIPTION OF THE DRAWINGS

FIG. 1C is a top plan view of entrance hole 16 with a section A-A' taken therethrough.

FIG. 1D is a cross sectional view of entrance hole 16 after plastic has been forced through it to make overmold section 2.

DESCRIPTION OF THE PREFERRED EMBODIMENTS

Figure 1A:
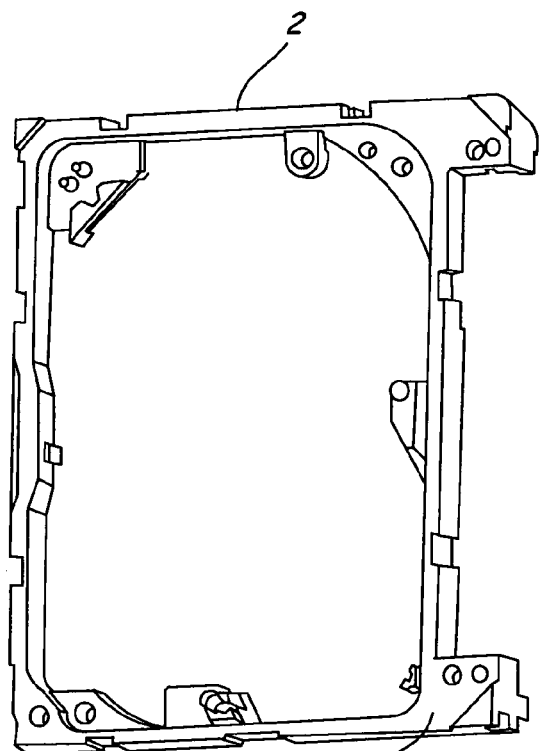
FIG. 1A is a plan view of a plastic overmolded portion of a base plate produced by an extrusion process.
Figure 1B:
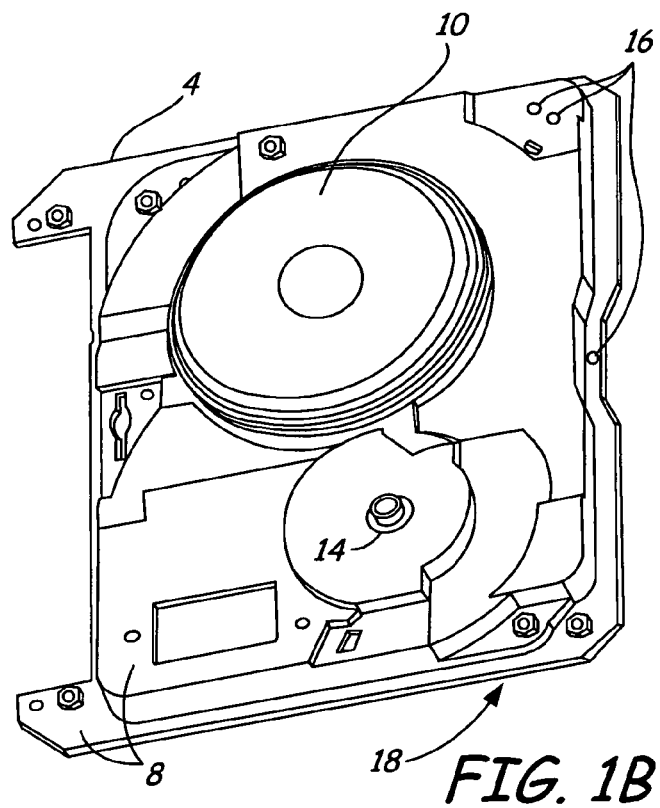
FIG. 1B is a plan view of a metal base portion of a base plate, and is designed to mate to the overmolded portion shown in FIG. 1A.

FIGS. 1A and 1B show two portions of an overmolded stamped base: an overmolded plastic portion 2 and a stamped metal base portion 4. Each of the portions 2 and 4 have an upper surface 6 and 8, respectively. (Plastic portion 2 and base 4 are separated here for clarity, but in practice are positioned closely adjacent to each other once overmolding is complete.) Other components of the disc drive are mounted on base portion 4; a plateau section 10 is formed in base 4 to support at least one disc (not shown), and a central hole 12 is formed in base 4 to allow a motor spindle (not shown) to be inserted through base 4. Another mounting hole 14 is provided to install a swing arm (not shown). The swing arm transports a head sensor of the disc drive and permits it to rapidly move in an arc across the surface of the disc.

In an overmolding process, a mold is positioned over and in contact with surface 8 of base 4 and from an underside 18 of base 4, liquid material such as heated plastic is forced through entrance holes (such as 16) in base 4. The material fills the space between surface 8 of base 4 and the mold, until the material is set and the mold is removed. For each functional feature of the drive which is formed through the overmolding process, there must be an entrance hole on metal base 4.

However, as the overmolded base consists of two parts with two completely different materials, they are not solidly bonded together. In many base plate designs, there are anti-delamination features, where internal function features serve their primary purpose but also function as mechanical catches for the overmolded section of base 4. Without illustrating the mechanical catches, FIG. 1C shows an entrance hole 16 with a section A-A'. FIG. 1D shows entrance hole 16 with plastic overmold 2, after the overmolding process occurs. An interface 20 is formed between plastic overmold 2 and metal base 4, which interface is not airtight. The lack of an airtight interface between portions 2 and 4 allows air from outside the disc drive to enter into the inner, precision-spaced workings of the hard disc drive and cause errors in spatial positioning, as well as cause contamination of the components in the drive. Contamination can include dirty air, humid air, particles, etc., including anything that can potentially cause a drive failure (such as corrosion, head crash, disk scratch, etc.).

Figure 2:
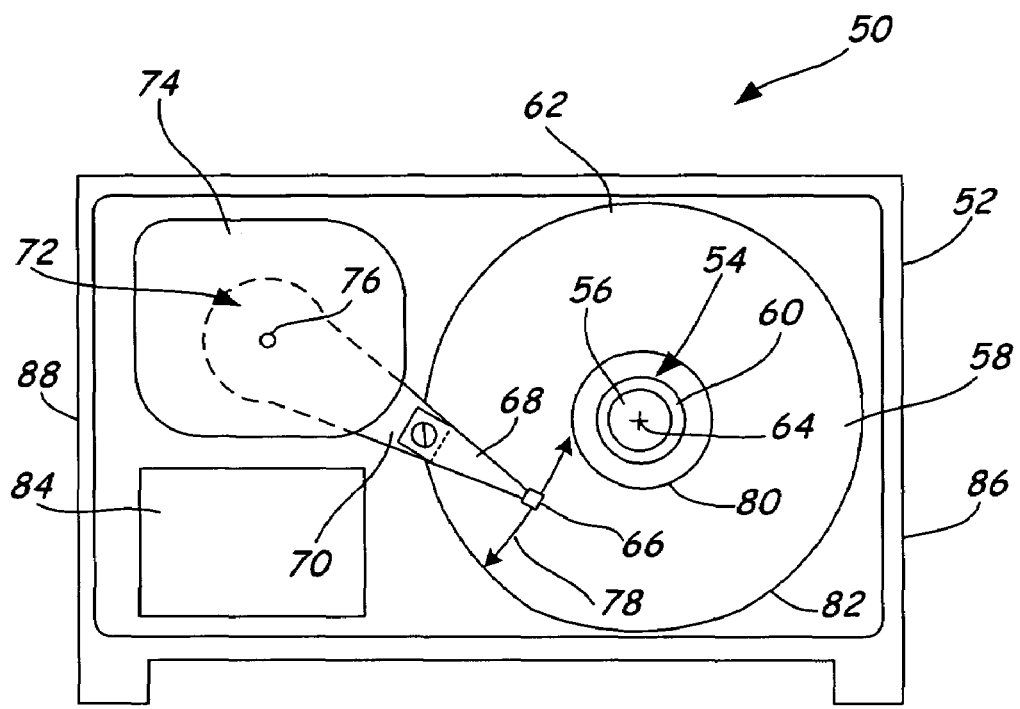
FIG. 2 is a simplified top plan view of a disc drive that includes a base in accordance with the present invention.

FIG. 2 is a simplified top plan view of a disc drive storage system 50 that includes a base 52 in accordance with the present invention. A top cover (not shown) attaches to base 52 to form a disc drive housing. Disc drive 50 also includes a single assembly 54 that includes a spindle 56 that is rotated by a spindle motor (not shown). A disc or disc pack 58 is mounted to spindle 56 by a disc clamp 60. Disc pack 58 includes one or more individual discs 62, which are mounted for co-rotation about a central axis 64 of spindle 56. Spindle 56 fits through a hole 57 (shown in FIGS. 3A-3B). Each disc surface has an associated disc head slider 66 which is mounted to disc drive 50 for communication with the disc surface. In the example shown in FIG. 2, sliders 66 are supported by suspensions 68 which are in turn attached to track assessing arms 70 of an actuator 72. The actuator 72 shown in FIG. 2 is of the type known as a rotary moving coil actuator and includes a voice coil motor, shown generally at 74. Voice coil motor 74 rotates actuator 72 with its attached heads 66 about a pivot shaft 76 to position heads 66 over a desired data track along an arcuate path 78 between a disc inner diameter 80 and a disc outer diameter 82. Sides 86, 88 define the size of base 50, conforming to Type I, Type II CompactFlash® specifications or the like.

Figure 3A:
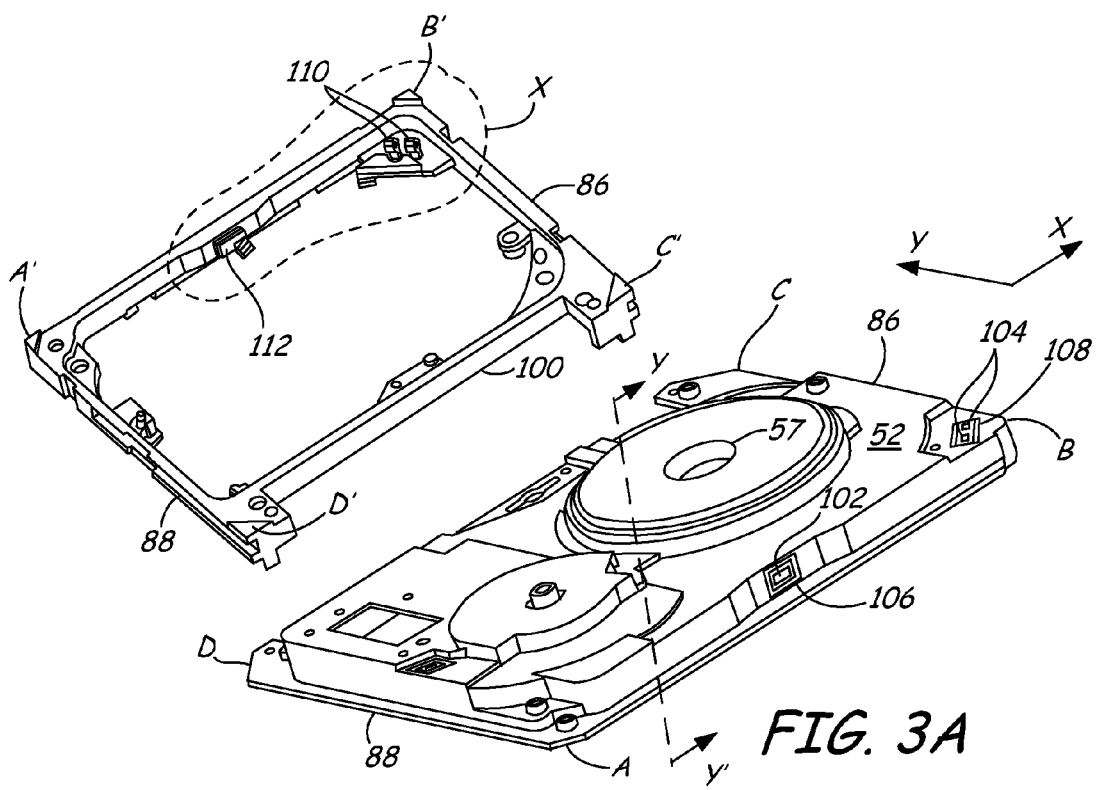
FIG. 3A is a plan view of the improved base and a corresponding plastic overmolded section, made according to the invention but separated for clarity. A portion of the plastic section designated within the dashed lines at X is enlarged in later drawings and a section Y-Y' is taken partially through the base.

FIG. 3A shows improved metal base plate 52 and plastic overmold section 100 made according to the invention. The two portions are purposely separated for clarity. In practice, corners A'-D' on overmolded section 100 mate to corners A-D on base 52. Each base plate made according to the present invention includes at least one entrance hole in its base, with each entrance hole corresponding to a plastic area molded over the entrance hole. This particular example embodiment has three entrance holes, one at 102 and a set of two entrance holes at 104, although may include as few as one and as many as required. An undercut groove 106 circumscribes or encircles entrance hole 102 on a side of base 52 between corners A and B and similarly, a groove 108 circumscribes the set of entrance holes 104,104. The words "circumscribe" or "encircle" with respect to some object such as a hole, as used in this document, means to scribe around or otherwise surround the object without touching the object but this definition shall in no way limit the shape of the enscription to a circle. For example, groove 108 being in the shape of an oval with respect to the surface of the base is made in accordance with the present invention. Furthermore, the depth of the groove will be defined by the specifications of disc drive conformance and various material parameters. The undercut grooves (such as 106,108) prevent or reduce air from flowing between the outside of disc drive 50 and the inside of disc drive 50, once the drive is assembled. In practice, base 52 and overmold material 100 will tend to seal itself in either X or Y direction (refer to FIG. 3A) because of overmold material shrinkage after molding. The shrinkage tends to reduce the amount of air which can flow from the exterior to the interior of disc drive 50 through the interface between base 52 and overmold material 100. However, the present invention further reduces the amount of air which can flow into the interior of drive 50, due to the combination of the overall shrinkage of the overmold material and the non-planar obstructions to the airflow in the form of the undercut grooves. Air entering into the interior of disc drive 50 contributes to contamination of the drive which can lead to unexpected touching of disc heads 66 to the surface of disc 62 by interfering with the fluid air currents caused by disc rotation, resulting in inconsistent sensing of data by the head as well as scratches on disc 62 which effectively obviate a portion of disc 62. In addition, unwanted air flowing into the interior of disc drive 50 contaminates the increasingly small components in the disc drive, interfering with operation of miniaturized moving components, such as actuator 72, motor 74 and the like, and also provides a ready source of contamination for surfaces of discs 62.

Figure 3B:
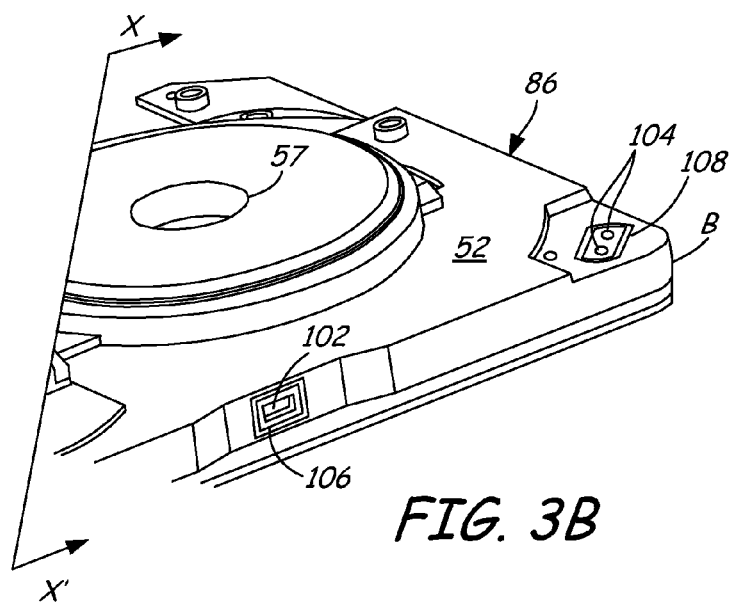
FIG. 3B is an enlarged sectional partial view of the base along sectional line Y-Y' shown in FIG. 3A.

FIG. 3B shows an enlarged section of base 52, taken along sectional line Y-Y' in FIG. 3A. Entrance hole 102 provides entry for plastic during an overmold process, and according to the present invention, groove 106 encircles hole 102 to minimize the leakage of air into the interior of drive 50. In a similar fashion, entrance holes 104 allow plastic flow during an overmold process and groove 108 encircles both entrance holes 104.

Figure 3C:
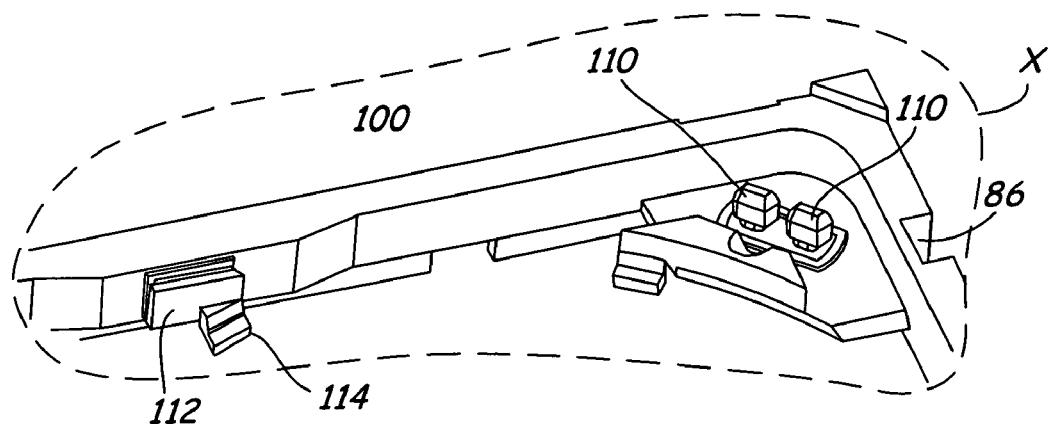
FIG. 3C is an enlarged sketch of the area shown in FIG. 3A at X.

FIG. 3C shows an enlarged section of overmolded plastic section 100, indicated at X in FIG. 3A. Plastic plugs 110, 110 (see FIGS. 3A, 3C) are created during the overmolding process and protrude into the space below drive 50. A plastic plug 112 (see FIGS. 3A, 3C) is similarly created during the overmold manufacturing process and protrudes from entrance hole 102. The shape of plastic plugs 110,110,112 is convex, but can be formed in any shape, so long as the plastic extends past groove 106, 106, 108, so as to provide as much of a sealing tendency as is possible. On plastic plug 112, there is a plastic extension 114 which serves to provide support for other components in drive 50, but is unrelated to the preferred functioning of the present invention. Once overmolded plastic section 100 is fully formed over metal base 52, it is impossible to see grooves 104, 106, 106.

Figure 4A:
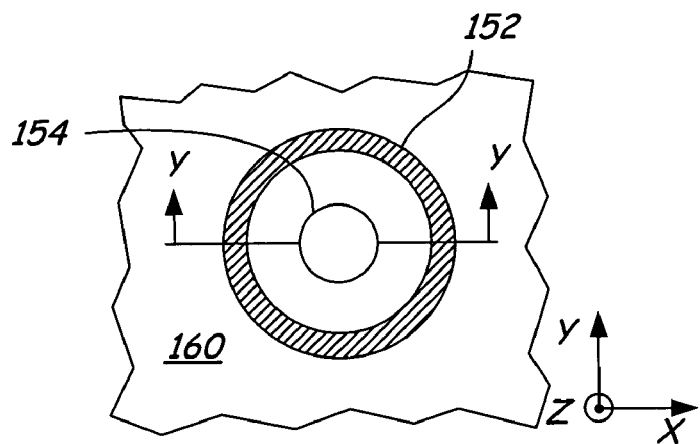
FIG. 4A is a top plan view and FIG. 4B is a side cross sectional view of an entrance hole of the present invention, showing a groove circumscribed around the entrance hole.
Figure 4B:
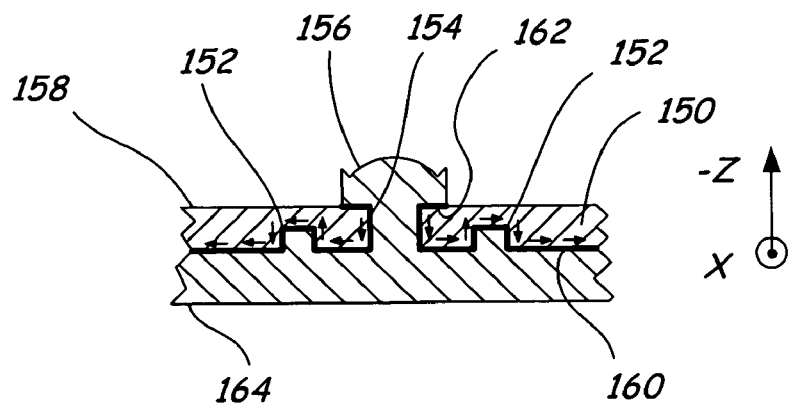

A cross sectional view of an entrance hole 154 with a surrounding groove 152 made according to the present invention is illustrated in FIG. 4A. FIG. 4A is a top plan view and FIG. 4B is a side cross sectional view taken along the line y-y in FIG. 4A. A portion of a base 150 is shown in FIGS. 4A, B with one surface 158 corresponding to the bottom of drive 50 and an opposite surface 160 corresponding to the surface of base 150. An entrance hole 154 has been stamped or machined in base 150, and a groove 152 encircles or surrounds hole 154, according to the present invention. Groove 152 may be any alternative shape with respect to the surface of base 150 which substantially encircles the entrance hole. For example, a groove in the shape of a rectangle or a hexagon (as considered in the plane of the interior surface of base 150) which substantially encircles the hole would work as well. Plastic overmold material 164 forms an interface with base 150. A plastic plug 156 extends below the surface of base 150 (but upwards in FIG. 4), so that a lip 162 of the plug rests against an area immediately adjacent to hole 154. The presence of undercut groove 152 creates a non-planar interface between base 150 and plastic overmold material 164, so that the passage of air to the inside of drive 50 is lessened substantially when coupled with the shrinkage of overmold material 164.

Figure 5A:
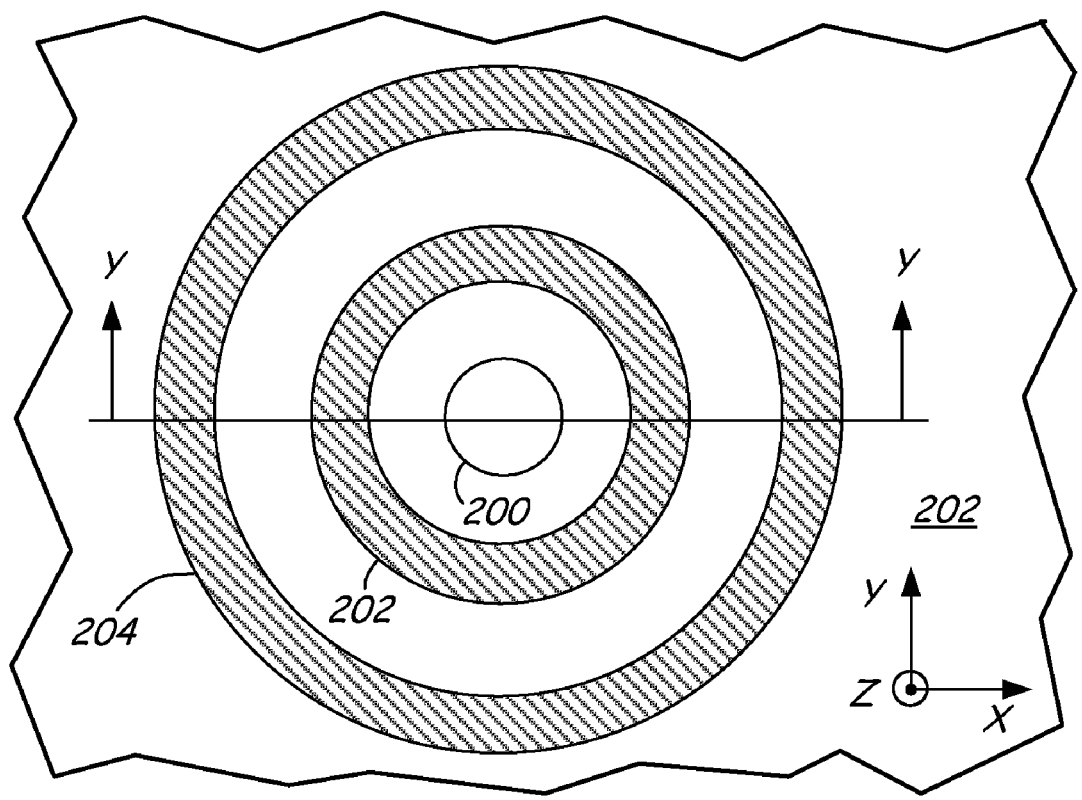
FIG. 5A is a top plan view and FIG. 5B is a side cross sectional view of a dual groove embodiment of the present invention, showing an entrance hole with two grooves circumscribed around the hole.
Figure 5B:
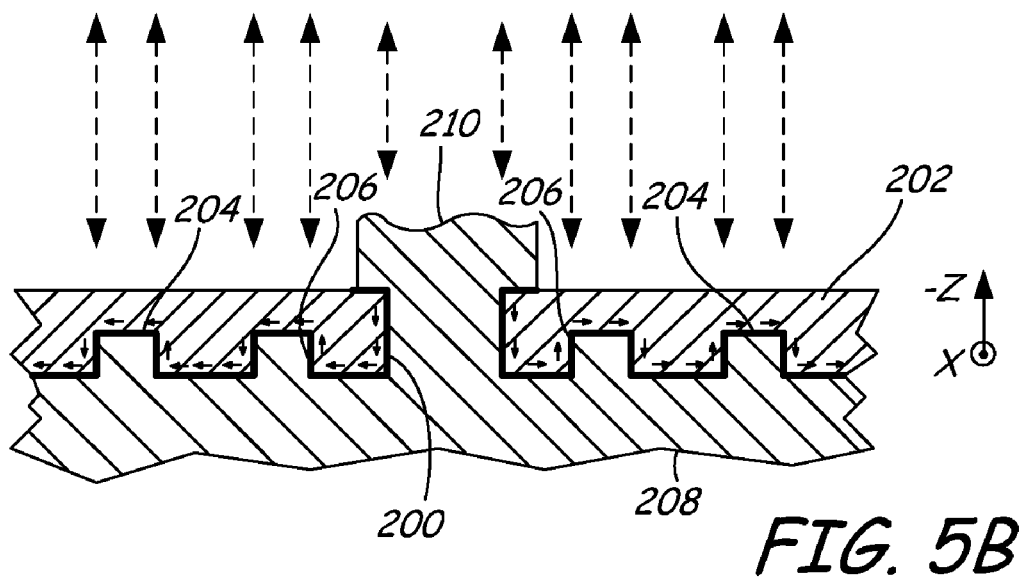

FIG. 5A is a top plan view and FIG. 5B is a side cross sectional view of an alternative embodiment of the present invention showing an entrance hole 200 is stamped or machined in a base 202 and encircled by two grooves 204, 206. Liquid plastic is injected against a mold (not shown) through hole 200 and plastic overmold material 208 is formed, ending in a plug 210 which extends below the surface of base 202 (but upwards in FIG. 5B). As many grooves as space allows may be added to create a more non-planar interface and further reduce flow of air into the interior of drive 50. Any shape of the groove can be used and the invention is not limited to a circle.

Figure 6A:
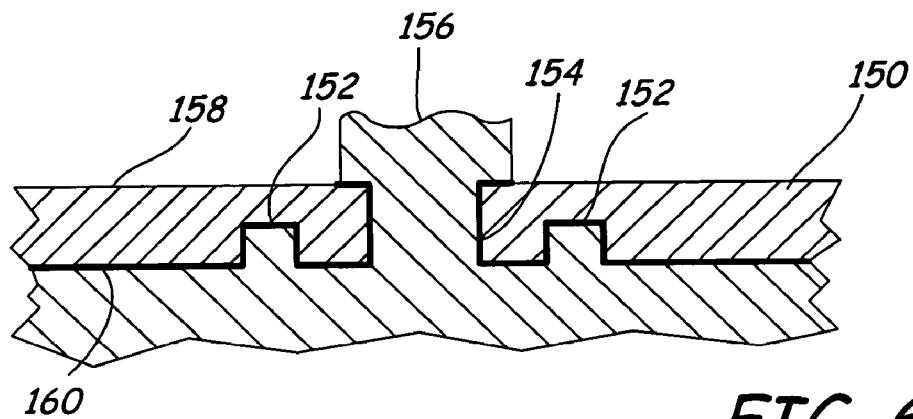
FIGS. 6A, 6B and 6C are side cross sectional views of example alternative undercut groove embodiments for use in the present invention.
Figure 6B:
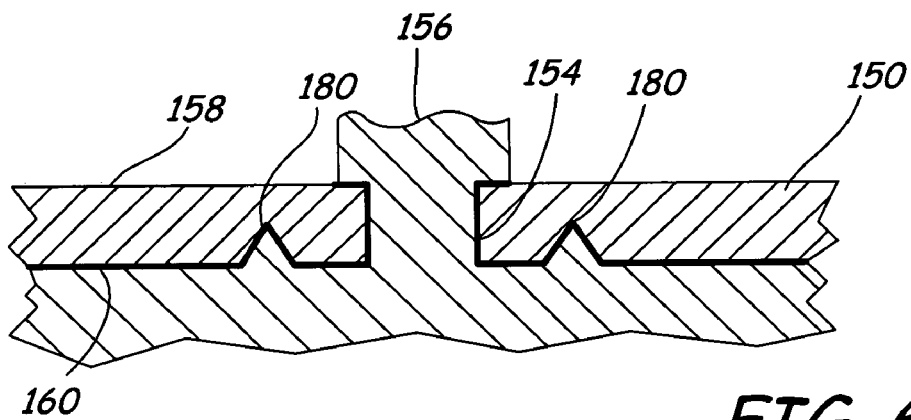
Figure 6C:
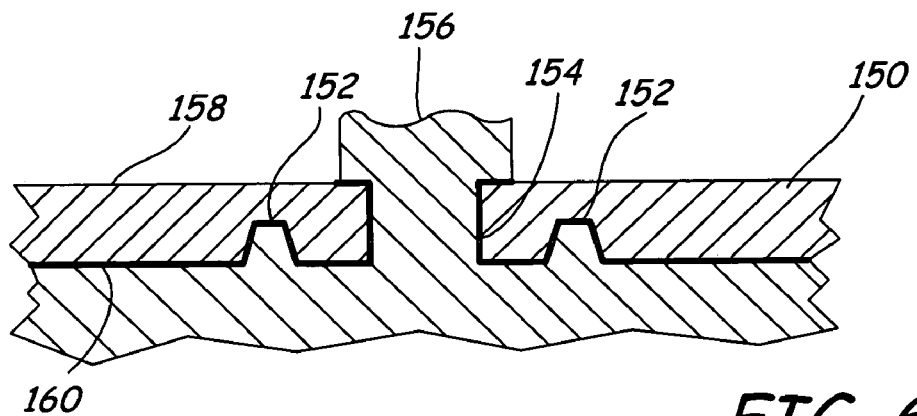

Other example embodiments of the present invention, but not by way of limitation, are shown in FIGS. 6A-C. A metal base 150 is shown in all three FIGS. 6A-6C, with an entrance hole 154. As in all preceding figures, a surface 158 of base 150 corresponds to the bottom of drive 50, and opposite surface 160 corresponds to the interior (although adjacent to plastic mold material) of base 150. Accordingly, a plug 156 extends downward below base 150 in practice, but is shown in an upwards direction in FIGS. 6A-6C. A rectangularly shaped undercut groove 152 is shown in FIG. 6A, while a triangularly shaped groove 180 is shown in FIG. 6B. Similarly, a groove 182 in the shape of a trapezoid is shown in FIG. 6C. The present invention also contemplates other groove shapes, each of which effectively lengthen the distance that air would travel through the interface and create a more non-planar interface between the base and the overmold material, through changing the shape and the depth of the groove as design specifications allow.

It is to be understood that even though numerous characteristics and advantages of various embodiments have been set forth in the foregoing description, together with details of the structure and function of various embodiments of the invention, this disclosure is illustrative only, and changes may be made in detail, especially in matters of structure and arrangements of parts within the principles of the present invention to the full extent indicated by the broad general meaning of the terms in which the appended claims are expressed. Accordingly, the particular elements may vary depending on the particular application for the base while maintaining substantially the same functionality and without departing from the scope and spirit of the present invention. For example, other variants of a metal and plastic overmold composite base other than those shown in this specification can practice the present invention. Furthermore, alternative materials other than plastic can be used in the process of the present invention. It is possible that certain detailed features on the metal base will require placing an entrance hole is such a place that it is impossible to fully encircle the hole with a groove. In those cases, it is enough to substantially circumscribe the hole with the groove, to minimize leakage of air into the disc drive interior as much as possible. Although the invention has been described with respect to a disc storage system, the invention is applicable to any enclosure with a base and an overmold. As used herein and illustrated in the figures, the "groove" can be either a depression or a raised surface on the base plate. Although a "V" shape is shown, other shapes can be used including any shape which form a depression in cross section. The use of groove increases the distance a contaminant must travel to enter the disc drive housing and provides a tighter seal between the overmold material and the base.

What is claimed is:

1. A base assembly for use in an air tight enclosure, comprising:
    a base plate having an entrance hole passing between a first and a second surface, the entrance hole defining an entrance hole diameter adapted for injecting an overmold material therethrough, where a first groove substantially surrounds the entrance hole; and
    an overmold molded to the base plate having a plug portion which extends through and spans the entrance hole diameter of the entrance hole and having other portions that conform to the first groove to provide a seal therebetween.

2. The apparatus of claim 1 including an additional groove substantially in the base plate which surrounds the entrance hole, the additional groove located outside the first groove.

3. The apparatus of claim 1 including a plurality of grooves substantially surrounding the entrance hole, each of the grooves in the plurality of grooves located successively further from the first groove.

4. The apparatus of claim 1 wherein the first groove is circular.

5. The apparatus of claim 1 wherein the base plate is a stamped process.

6. The apparatus of claim 1 wherein the first groove is a stamped process in the base plate.

7. The apparatus of claim 1 wherein the first groove has two sidewalls and a floor and each sidewall is substantially perpendicular to the floor.

8. The apparatus of claim 1 wherein the first groove has two sidewalls and a floor and each sidewall is substantially at an obtuse angle with respect to the floor.

9. The apparatus of claim 1 wherein the first groove has walls which form depression.

10. The apparatus of claim 1 wherein the first groove is formed in a trapezoid shape.

11. The apparatus of claim 1 including a plurality of components supported by the base plate.

12. The apparatus of claim 1 wherein the overmold comprises plastic.

13. The apparatus of claim 1 wherein the base plate comprises metal.

14. A disc storage system in an enclosure which includes the base plate and overmold of claim 1.

15. The apparatus of claim 1 wherein the groove comprises a depression in the base plate.

16. The apparatus of claim 1 wherein the groove comprises a raised surface in the base plate.

17. A base assembly for use in an airtight enclosure, comprising:
- a base plate means for placing a set of components thereon and having an entrance hole passing between a first and a second surface;
- first groove means in the base plate means for reducing the passage of air between the second surface and the first surface; and
- overmold means for mounting on the base plate means and conforming to the groove means providing a seal therebetween.

18. The apparatus of claim 17 including an additional groove means for further reducing the passage of air.

19. The apparatus of claim 17 wherein the first groove means protrudes from the base plate means.

20. The apparatus of claim 17 wherein the first groove means recedes into the base plate means.

* * * * *